US008270367B2

(12) United States Patent
Isobe et al.

(10) Patent No.: US 8,270,367 B2
(45) Date of Patent: Sep. 18, 2012

(54) HANDOVER CONTROL APPARATUS, RELAY ROUTER, GATEWAY APPARATUS, ACCESS ROUTER, BASE STATION, MOBILE COMMUNICATION SYSTEM, AND HANDOVER CONTROL METHOD

(75) Inventors: Shinichi Isobe, Yokosuka (JP); Ken Igarashi, Yokohama (JP); Atsushi Iwasaki, Yokosuka (JP); Kenji Nishimura, Yokosuka (JP); Takashi Koshimizu, Yokosuka (JP)

(73) Assignee: NTT DoCoMo, Inc., Tokyo (JP)

( * ) Notice: Subject to any disclaimer, the term of this patent is extended or adjusted under 35 U.S.C. 154(b) by 788 days.

(21) Appl. No.: 11/963,133

(22) Filed: Dec. 21, 2007

(65) Prior Publication Data

US 2008/0107081 A1    May 8, 2008

Related U.S. Application Data

(63) Continuation of application No. 10/379,804, filed on Mar. 6, 2003, now Pat. No. 7,362,728.

(30) Foreign Application Priority Data

Mar. 6, 2002    (JP) ................................. 2002-060893

(51) Int. Cl.
*H04W 4/00* (2009.01)
*H04B 7/212* (2006.01)

(52) U.S. Cl. ........ 370/331; 370/332; 370/333; 370/338; 370/351; 370/395.21; 455/436; 455/437; 455/438; 455/439; 455/440; 455/441; 455/442; 455/443; 455/444; 455/445

(58) Field of Classification Search .......... 455/436–445; 370/331, 329, 338, 332, 333, 334, 351, 352, 370/389, 395.1, 395.2, 395.21, 401
See application file for complete search history.

(56) References Cited

U.S. PATENT DOCUMENTS

| 4,873,517 | A | 10/1989 | Baratz et al. |
| 5,504,935 | A | 4/1996 | Vercauteren |

(Continued)

FOREIGN PATENT DOCUMENTS

EP    1 009 141 A1    6/2000

(Continued)

OTHER PUBLICATIONS

Chai-Keong Toh, Performance evaluation of crossover switch discovery algorithms for wireless ATM LANs, Mar. 24-28, 1996, INFOCOM 1996. Fifteenth annual joint conference of the IEEE computer societies, vol. 3, pp. 1380-1387.*

(Continued)

*Primary Examiner* — Olumide T Ajibade Akonai
(74) *Attorney, Agent, or Firm* — Oblon, Spivak, McClelland, Maier & Neustadt, L.L.P.

(57) ABSTRACT

A mobile communication system 100 according to the present invention comprises handover control apparatus 1 and radio terminal unit 10. The handover control apparatus 1 controls handover of a radio terminal unit 10 between access routers 31-34 provided in respective base stations 21-24 for radio communication with the radio terminal unit 10. The handover control apparatus 1 counts the number of relay routers for every candidate access router 32-34 for a destination of the radio terminal unit 10, from a gateway device 52 and determines a COR on the basis of the number of relay routers for every access router 32, 33, 34 thus counted.

6 Claims, 11 Drawing Sheets

U.S. PATENT DOCUMENTS

| | | | |
|---|---|---|---|
| 5,602,839 A | | 2/1997 | Annapareddy et al. |
| 6,023,461 A | * | 2/2000 | Raychaudhuri et al. ...... 370/331 |
| 6,075,777 A | | 6/2000 | Agrawal et al. |
| 6,564,258 B1 | | 5/2003 | Uniacke |
| 6,654,361 B1 | | 11/2003 | Dommety et al. |
| 6,704,283 B1 | | 3/2004 | Stiller et al. |
| 6,735,177 B1 | * | 5/2004 | Suzuki ........................ 370/238 |
| 6,763,007 B1 | * | 7/2004 | La Porta et al. .............. 370/331 |
| 6,771,604 B1 | * | 8/2004 | Dommety et al. ............ 370/238 |
| 6,791,957 B2 | * | 9/2004 | Kim .............................. 370/331 |
| 2001/0046223 A1 | * | 11/2001 | Malki et al. ................... 370/338 |
| 2004/0063429 A1 | * | 4/2004 | Igarashi et al. ............... 455/436 |
| 2004/0125795 A1 | | 7/2004 | Corson et al. |
| 2004/0196808 A1 | | 10/2004 | Chaskar et al. |

FOREIGN PATENT DOCUMENTS

| | | |
|---|---|---|
| JP | 2001-333110 | 11/2001 |
| WO | WO 01/06732 A1 | 1/2001 |

OTHER PUBLICATIONS

Gopal Dommety, Malathi Veeraraghavan, Mukesh Singhal, A Route Optimization Algorithm and Its Application to Mobile Location Managament in ATM Networks, Aug. 1998, IEEE Journal on Selected Areas in Communications, vol. 16, No. 6, pp. 890-908.*

R. Ramjee, et al., "IP Micro-mobility support using Hawaii", IETF Standard-Working-Draft, Internet Engineering Task Force, vol. mobileip, No. 1, XP-015023350, Jul. 7, 2000, pp. 1-31.

* cited by examiner

| ADDRESS OF GATEWAY DEVICE | ADDRESS OF COR |
|---|---|
| 51 | 405 |
| 52 | 406 |
| 53 | 403 |
| 54 | 408 |

| 32 | | |
|---|---|---|
| 31 | 4 | |
| 33 | 3 | |
| 34 | 3 | |

| ACCESS ROUTER | ADDRESS OF COR |
|---|---|
| AR1 | R1 |
| AR2 | R2 |
| AR3 | R2 |

Fig.10A

|     | AR1 | AR2 | AR3 |
|-----|-----|-----|-----|
| AR0 | 3   | 2   | 2   |
|     |     |     |     |
|     |     |     |     |
|     |     |     |     |

Fig.10B

|     | AR1 | AR2 | AR3 |
|-----|-----|-----|-----|
| AR0 | 4   | 3   | 3   |
| R2  | 2   | 1   | 1   |
|     |     |     |     |
|     |     |     |     |

Fig.10C

|     | AR1 | AR2 | AR3 |
|-----|-----|-----|-----|
| AR0 | 5   | 4   | 4   |
| R2  | 3   | 2   | 2   |
| R1  | 1   | 2   | 2   |
|     |     |     |     |

|  | AR1 | AR2 | AR3 |
|---|---|---|---|
| AR0 | 6 | 5 | 5 |
| R2 | 4 | 3 | 3 |
| R1 | 2 | 3 | 3 |
| GW | 2 | 3 | 3 |

|  | AR1 | AR2 | AR3 | SUM |
|---|---|---|---|---|
| AR0 | 6 | 5 | 5 | 16 |
| R2 | 4 | 3 | 3 | 10 |
| R1 | 2 | 3 | 3 | 8 |
| GW | 2 | 3 | 3 | 8 |

|     | AR1 | AR2 | AR3 |
|-----|-----|-----|-----|
| AR0 | 3   | 2   | 2   |
| R2  | 2   | ①   | ①   |
| R1  | ①   | 2   | 2   |
| GW  | 2   | 3   | 3   |

326

HANDOVER CONTROL APPARATUS, RELAY ROUTER, GATEWAY APPARATUS, ACCESS ROUTER, BASE STATION, MOBILE COMMUNICATION SYSTEM, AND HANDOVER CONTROL METHOD

CROSS-REFERENCE TO RELATED APPLICATIONS

This application is a continuation of and claims the benefit of priority from U.S. application Ser. No. 10/379,804, filed Mar. 6, 2003, and from prior Japanese Patent application No. 2002-060893, filed Mar. 6, 2002. The entire contents of the above application are incorporated herein by reference.

BACKGROUND OF THE INVENTION

1. Field of the Invention

The present invention relates to a handover control apparatus, a relay router, a gateway apparatus, an access router, a base station, a mobile communication system, and a handover control method.

2. Related Background Art

In recent years, packet communication with high utilization efficiency of communication links is used for transmission and reception of data between radio terminal units including cellular phones. In the packet communication, a handover involves a process of switching an access router (AR; Access Router) for transmitting packets to the radio terminal unit, over to another. And there is concern that some packets fail to arrive at the radio terminal unit during the handover (packet loss). In order to reduce the packet loss, packets transmitted from a correspondent node with the radio terminal unit were thus buffered during the handover in the old access router before the handover, and the packets were forwarded to a new access router of a switchover destination after completion of the handover.

SUMMARY OF THE INVENTION

The major topologies (connection forms) in the mobile communication systems are generally classified under the tree type and the mesh type, and in either case of these topologies, there arose the problem as described below about the handover control. Namely, the packets transmitted from the correspondent node during the handover were buffered in the old AR. For this reason, a redundant path is made between the old AR and the new AR, so as to result in waste of network resources.

There concurrently exist a communication path for forwarding packets from the old AR to the new AR and a communication path for transmitting packets from the packet source to the new AR. This causes the packets routed via the respective communication paths to arrive in a mixed state, and thus raises concern about occurrence of a miss-ordering of packets during the handover.

The present invention has been accomplished in view of the above problem and an object of the present invention is to realize a packet forward through an optimal path to a radio terminal unit after a handover, regardless of the topologies, thereby effectively utilizing the network resources and preventing the occurrence of the miss-ordering of packets and, as a consequence, to provide a handover control apparatus, a relay router, a gateway apparatus, an access router, a base station, a mobile communication system, and a handover control method for efficiently performing handover control.

In order to solve the above problem, a handover control apparatus according to the present invention is a handover control apparatus comprising gateway apparatus, relay routers, and base stations having access router apparatus, and adapted to control handover of a radio terminal unit between access routers provided in respective base stations for radio communication with the radio terminal unit, the handover control apparatus comprising: counting means for counting the number of relay routers for every candidate access router for a destination of the radio terminal unit, from the gateway apparatus; and determining means for determining a COR (Cross Over Router) on the basis of the number of relay routers for every access router counted by the counting means.

A relay router according to the present invention is a relay router for transmission and reception of data between a plurality of base stations or a plurality of access routers, and gateway apparatus, the relay router comprising: counting means for counting the number of relay routers for every candidate access router for a destination of a radio terminal unit, from the getaway apparatus; and determining means for determining a COR on the basis of the number of relay routers for every access router, counted by the counting means.

A gateway apparatus according to the present invention is a gateway apparatus connected to access routers, the gateway apparatus comprising: counting means for counting the number of relay routers for every candidate access router for a destination of a radio terminal unit, from the gateway apparatus; and determining means for determining a COR on the basis of the number of relay routers for every access router counted by the counting means.

A handover control method according to the present invention is a handover control method of controlling handover of a radio terminal unit between access routers provided in respective base stations for radio communication with the radio terminal unit, the handover control method comprising: a counting step wherein a handover control apparatus counts the number of relay routers for every candidate access router for a destination of the radio terminal unit, from gateway apparatus; and a determining step wherein the handover control apparatus determines a COR on the basis of the number of relay routers for every access router counted in the counting step, from the gateway apparatus.

According to these aspects of the invention, counted is the number of relay routers for every candidate access router for the destination of the radio terminal unit, and the COR is determined on the basis of the number of relay routers for every access router, which is the result of the counting. Efficient handover control can be implemented by using a path with the smaller number of relay routers for the packet forward. For example, the COR is selected as a communication device with which the number of relay routers from the gateway apparatus via this communication device to the candidate access router for the destination of the radio terminal unit is minimum, out of communication devices (each of which is one of a gateway device, a relay router, and an access router) on the route between the gateway apparatus and the access router. By selecting this COR, it is feasible to perform the efficient handover control. Namely, if packets to the radio terminal unit are buffered in this COR during the handover, the packets can be forwarded through the optimal path to the radio terminal unit after the handover; it is thus feasible to effectively utilize the network resources and to prevent the occurrence of the miss-ordering of packets.

In the handover control apparatus according to the present invention, preferably, the determining means determines as the COR a relay router with which a sum of the numbers of relay routers for every candidate access router for the destination of the radio terminal unit, counted by the counting means, is minimum, out of candidate relay routers for the COR.

In the relay router according to the present invention, preferably, the determining means determines as the COR a relay router with which a sum of the numbers of relay routers for every candidate access router for the destination of the radio terminal unit, counted by the counting means, is minimum, out of candidate relay routers for the COR.

In the gateway apparatus according to the present invention, preferably, the determining means determines as the COR a relay router with which a sum of the numbers of relay routers for every candidate access router for the destination of the radio terminal unit, counted by the counting means, is minimum, out of candidate relay routers for the COR.

In the handover control method according to the present invention, preferably, in the determining step the handover control apparatus determines as the COR a relay router with which a sum of the numbers of relay routers for every candidate access router for the destination of the radio terminal unit, counted in the counting step, is minimum, out of candidate relay routers for the COR.

According to these aspects of the invention, determined as the COR is a relay router with which the sum of the numbers of relay routers for every candidate access router for the destination of the radio terminal unit is minimum, out of the candidate relay routers for the COR. Efficient handover control can be implemented by using a path with the smaller number of relay routers for the packet forward. According to these aspects of the invention, a communication device with which the sum of the numbers of relay routers between the gateway apparatus and the access routers is minimum is selected as the COR, whereby it is thus feasible to perform the efficient handover control. Namely, if packets to the radio terminal unit are buffered in this COR during the handover, the packets can be forwarded through the optimal path to the radio terminal unit after the handover; it is thus feasible to effectively utilize the network resources and to prevent the occurrence of the mis-ordering of packets.

In the handover control apparatus according to the present invention, more preferably, the counting means counts the number of relay routers for every candidate access router for the destination of the radio terminal unit in response to a COR determination request transmitted from the access router.

In the relay router according to the present invention, more preferably, the counting means counts the number of relay routers for every candidate access router for the destination of the radio terminal unit in response to a COR determination request transmitted from the access router.

In the gateway apparatus according to the present invention, more preferably, the counting means counts the number of relay routers for every candidate access router for the destination of the radio terminal unit in response to a COR determination request transmitted from the access router.

In the handover control method according to the present invention, more preferably, the counting step is for the handover control apparatus to count the number of relay routers for every candidate access router for the destination of the radio terminal unit in response to a COR determination request transmitted from the access router.

According to these aspects of the invention, the number of relay routers is counted for every access router in response to the COR determination request transmitted from the access router. The access router having transmitted the COR determination request is an old access router before movement of the radio terminal unit. Accordingly, for determining the COR, the number of relay routers is counted for every access router to which the radio terminal unit can move from the old access router, after the handover.

In the handover control apparatus according to the present invention, more preferably, the counting means counts the number of relay routers from a plurality of gateway devices to every candidate access router for the destination of the radio terminal unit, in response to a COR determination request transmitted from the access router for every gateway device.

In the relay router according to the present invention, more preferably, the counting means counts the number of relay routers from a plurality of gateway devices to every candidate access router for the destination of the radio terminal unit, in response to a COR determination request transmitted from the access router for every gateway device.

In the gateway apparatus according to the present invention, more preferably, the counting means counts the number of relay routers from a plurality of gateway devices to every candidate access router for the destination of the radio terminal unit, in response to a COR determination request transmitted from the access router for every gateway device.

In the handover control method according to the present invention, more preferably, in the counting step the handover control apparatus counts the number of relay routers from a plurality of gateway devices to every candidate access router for the destination of the radio terminal unit, in response to a COR determination request transmitted from the access router for every gateway device.

According to these aspects of the invention, the number of relay routers from a plurality of gateway device to every candidate access router for the destination of the radio terminal unit is counted in response to the COR determination request transmitted from the access router. The number of relay routers is counted for every gate way device. The access router having transmitted the COR determination request is an old access router before movement of the radio terminal unit. Therefore, for determining the COR, the number of relay routers for each access router to which the radio terminal unit can move from the old access router, after the handover is counted for every gateway device. By determining the COR for every gateway device in this way, it is feasible to determine the optimal COR in the case where the network is constructed in such a mesh topology as to establish a plurality of paths in the mobile communication system. As a consequence, the optimal COR is determined, regardless of the network topologies, and it is thus feasible to perform the efficient handover control.

The handover control apparatus according to the present invention is more preferably configured to further comprise notifying means for notifying the access router having transmitted the COR determination request, of the COR determined by the determining means.

The relay router according to the present invention is more preferably configured to further comprise notifying means for notifying the access router having transmitted the COR determination request, of the COR determined by the determining means.

The gateway apparatus according to the present invention is more preferably configured to further comprise notifying means for notifying the access router having transmitted the COR determination request, of the COR determined by the determining means.

The handover control method according to the present invention is more preferably configured to further comprise a notifying step of notifying the access router having transmitted the COR determination request, of the COR determined in the determining step.

According to these aspects of the invention, the access router having transmitted the COR determination request is notified of the COR thus determined. If packets to the radio terminal unit are buffered in this COR during the handover, the packets can be forwarded through the optimal path to the radio terminal unit after the handover; it is thus feasible to effectively utilize the network resources and to prevent the occurrence of the miss-ordering of packets. As a result, the handover control can be performed more efficiently.

The handover control apparatus according to the present invention is more preferably configured to further comprise notifying means for notifying the access router having transmitted the COR determination request, of an address of the COR, determined by the determining means, corresponding to a predetermined gateway device.

The relay router according to the present invention is more preferably configured to further comprise notifying means for notifying the access router having transmitted the COR determination request, of an address of the COR, determined by the determining means, corresponding to a predetermined gateway device.

The gateway apparatus according to the present invention is more preferably configured to further comprise notifying means for notifying the access router having transmitted the COR determination request, of an address of the COR, determined by the determining means, corresponding to a predetermined gateway device.

The handover control method according to the present invention is more preferably configured to further comprise a notifying step of notifying the access router having transmitted the COR determination request, of an address of the COR, determined in the determining step, corresponding to a predetermined gateway device.

According to these aspects of the invention, the access router having transmitted the COR determination request is notified of the COR corresponding to the predetermined gateway device, thus determined. If packets to the radio terminal unit are buffered in this COR during the handover, the packets can be forwarded through the optimal path to the radio terminal unit after the handover; it is thus feasible to effectively utilize the network resources and to prevent the occurrence of the miss-ordering of packets. By notifying the access router of the COR corresponding to the predetermined gateway device in this way, the optimal COR can be determined, regardless of the network topologies, and the handover control can be performed more efficiently.

The handover control apparatus according to the present invention is more preferably configured to further comprise storage means for storing the COR determined by the determining means and an address of a gateway device corresponding to the COR, in correspondence to each other.

An access router according to the present invention is an access router connected to the gateway apparatus as described above and to the relay router as described above, the access router comprising: storage means for storing the COR determined by the determining means and an address of the gateway apparatus corresponding to the COR, in correspondence to each other.

A base station according to the present invention is a base station for detecting handover of a radio terminal unit, the base station comprising: an apparatus having the function of the access router as described above.

The handover control method according to the present invention is more preferably configured to further comprise a storage step of storing the COR determined in the determining step and an address of the gateway device corresponding to the COR, in correspondence to each other in storage means.

According to these aspects of the invention, the COR thus determined is stored in correspondence to the address of the gateway device corresponding to the COR. When the old access router before movement by handover refers to the COR stored and buffers packets to the radio terminal unit in this COR during the handover, the packets can be forwarded through the optimal path to the radio terminal unit after the handover; it is thus feasible to effectively utilize the network resources and to prevent the occurrence of the miss-ordering of packets. By storing the address of the gateway device corresponding to the COR in correspondence thereto in this way, the optimal COR can be determined, regardless of the network topologies, and the handover control can be performed more efficiently.

In the handover control apparatus according to the present invention, more preferably, the COR determination request is transmitted from the radio terminal unit via the access router.

In the relay router according to the present invention, more preferably, the COR determination request is transmitted from the radio terminal unit via the access router.

In the gateway apparatus according to the present invention, more preferably, the COR determination request is transmitted from the radio terminal unit via the access router.

In the handover control method according to the present invention, more preferably, the COR determination request is transmitted from the radio terminal unit via the access router.

The present invention is also applicable to construction and operation of a mobile communication system comprising the handover control apparatus as described above, and a radio terminal unit, and adapted to perform radio communication between the handover control apparatus and the radio terminal unit.

According to these aspects of the invention, the COR determination request is transmitted from the radio terminal unit via the access router. The radio terminal unit having transmitted the COR determination request is a radio terminal unit radio-connected to the access router, before the movement by handover. Therefore, for determining the COR, the number of relay routers is counted for every access router to which the radio terminal unit can move after the handover.

In the handover control apparatus according to the present invention, more preferably, the COR determination request is transmitted from the access router.

In the relay router according to the present invention, more preferably, the COR determination request is transmitted from the access router.

In the gateway apparatus according to the present invention, more preferably, the COR determination request is transmitted from the access router.

In the handover control method according to the present invention, more preferably, the COR determination request is transmitted from the access router.

The present invention is also applicable to construction and operation of a mobile communication system comprising the handover control apparatus as described above, and a radio terminal unit, and adapted to perform radio communication between the handover control apparatus and the radio terminal unit.

According to these aspects of the invention, the COR determination request is transmitted from the access router. The access router having transmitted the COR determination request is an access router to which the radio terminal unit before the movement by handover is radio-connected. Accordingly, for determining the COR, the number of relay routers is counted for every access router to which the radio terminal unit can move after the handover.

A handover control apparatus according to the present invention is a handover control apparatus comprising gateway apparatus, relay routers, and base stations having access router apparatus, and adapted to control handover of a radio terminal unit between access routers provided in respective base stations for radio communication with the radio terminal unit, the handover control apparatus comprising: counting means for counting the number of relay routers for every candidate access router for a destination of the radio terminal unit, from a relay router; and determining means for determining a COR on the basis of the number of relay routers for every access router counted by the counting means.

A relay router according to the present invention is a relay router for transmission and reception of data between a plurality of base stations or a plurality of access routers, and gateway apparatus, the relay router comprising: counting means for counting the number of relay routers for every candidate access router for a destination of the radio terminal unit, from the relay router; and determining means for determining a COR on the basis of the number of relay routers for every access router, counted by the counting means.

A gateway apparatus according to the present invention is a gateway apparatus connected to access routers, the gateway apparatus comprising: counting means for counting the number of relay routers for every candidate access router for a destination of a radio terminal unit, from the gateway apparatus; and determining means for determining a COR on the basis of the number of relay routers for every access router counted by the counting means.

A handover control method according to the present invention is a handover control method of controlling handover of a radio terminal unit between access routers provided in respective base stations for radio communication with the radio terminal unit, the handover control method comprising: a counting step wherein a handover control apparatus counts the number of relay routers for every candidate access router for a destination of the radio terminal unit, from a relay router; and a determining step of determining a COR on the basis of the number of relay routers for every access router counted in the counting step.

According to these aspects of the invention, the number of relay routers for every candidate access router for the destination of the radio terminal unit is counted from the relay router, and the COR is determined on the basis of the number of relay routers for every access router, which is the result of the counting. Efficient handover control can be implemented by using a path with the smaller number of relay routers for the packet forward. According to these aspects of the invention, a communication device with the minimum sum of the numbers of relay routers between the relay router and the access router is selected as the COR, and thus the efficient handover control can be performed. Namely, if packets to the radio terminal unit are buffered in this COR during the handover, the packets can be forwarded through the optimal path to the radio terminal unit after the handover; it is thus feasible to effectively utilize the network resources and to prevent the occurrence of the miss-ordering of packets.

In the handover control apparatus according to the present invention, preferably, the counting means counts the number of relay routers for every candidate access router for the destination of the radio terminal unit in response to a COR determination request transmitted from the access router.

In the relay router according to the present invention, preferably, the counting means counts the number of relay routers for every candidate access router for the destination of the radio terminal unit in response to a COR determination request transmitted from the access router.

In the gateway apparatus according to the present invention, preferably, the counting means counts the number of relay routers for every candidate access router for the destination of the radio terminal unit in response to a COR determination request transmitted from the access router.

In the handover control method according to the present invention, preferably, the counting step is to count the number of relay routers for every candidate access router for the destination of the radio terminal unit in response to a COR determination request transmitted from the access router.

According to these aspects of the invention, the number of relay routers is counted for every candidate access router for the destination of the radio terminal unit in response to the COR determination request transmitted from the access router. The access router having transmitted the COR determination request is an old access router before the movement of the radio terminal unit. Therefore, for determining the COR, the number of relay routers is counted for every access router to which the radio terminal unit can move from the old access router, after the handover.

In the handover control apparatus according to the present invention, more preferably, the COR determination request includes areas for storing an address of a candidate relay router for the COR, an address of every candidate access router for the destination of the radio terminal unit, the number of relay routers, and an address of the COR determined by the determining means.

In the relay router according to the present invention, more preferably, the COR determination request includes areas for storing an address of a candidate relay router for the COR, an address of every candidate access router for the destination of the radio terminal unit, the number of relay routers, and an address of the COR determined by the determining means.

In the gateway apparatus according to the present invention, more preferably, the COR determination request includes areas for storing an address of a candidate gateway device or relay router for the COR, an address of every candidate access router for the destination of the radio terminal unit, the number of relay routers, and an address of the COR determined by the determining means.

In the handover control method according to the present invention, more preferably, the COR determination request includes areas for storing an address of a candidate relay router for the COR, an address of every candidate access router for the destination of the radio terminal unit, the number of relay routers, and an address of the COR determined in the determining step.

The present invention is also applicable to construction and operation of a mobile communication system comprising the handover control apparatus as described above, and a radio terminal unit, and adapted to perform radio communication between the handover control apparatus and the radio terminal unit.

The COR determination request is successively received by the relay routers constituting the shortest path between the old access router before the movement by handover and the gateway apparatus. According to these aspects of the invention, the relay router is allowed to refer to the number of relay routers from a communication device (an access router or a relay router) as a source of the COR determination request, in the COR determination request thus received, and to compare the number of relay routers with the number of relay routers from a communication device (a relay router or a gateway device) as a destination of the COR determination request.

A handover control apparatus according to the present invention is a handover control apparatus comprising gateway apparatus, relay routers, and base stations having access router apparatus, and adapted to control handover of a radio terminal unit between access routers provided in respective base stations for radio communication with the radio terminal unit, the handover control apparatus comprising: counting means for counting the number of relay routers for every candidate access router for a destination of the radio terminal unit, from a relay router; and determining means for determining as a COR a relay router with which a sum of the numbers of relay routers for every candidate access router for the destination of the radio terminal unit, counted by the counting means, is minimum, out of candidate relay routers for the COR.

An access router according to the present invention is an access router provided in a base station for detecting handover of a radio terminal unit, and connected to relay routers, the access router comprising: receiving means for receiving the number of relay routers for every candidate access router for a destination of the radio terminal unit, counted from a relay router, from the relay router; and determining means for determining as a COR a relay router with which a sum of the numbers of relay routers received by the receiving means is minimum, out of candidate relay routers for the COR.

A base station according to the present invention is a base station for detecting handover of a radio terminal unit, the base station comprising: an apparatus having the function of the access router as described above.

A relay router according to the present invention is a relay router for transmission and reception of data between a plurality of base stations or a plurality of access routers, and gateway apparatus, the relay router comprising: transmitting means for transmitting the number of relay routers for every candidate access router for a destination of a radio terminal unit, counted from a relay router, to an access router to which the radio terminal unit was connected before handover.

A gateway apparatus according to the present invention is a gateway apparatus connected to access routers, the gateway apparatus comprising: transmitting means for transmitting the number of relay routers for every candidate access router for a destination of a radio terminal unit, counted from the gateway apparatus, to an old access router before handover.

The present invention is also applicable to construction and operation of a mobile communication system comprising the handover control apparatus as described above, and a radio terminal unit, and adapted to perform radio communication between the handover control apparatus and the radio terminal unit.

A handover control method according to the present invention is a handover control method of controlling handover of a radio terminal unit between access routers provided in respective base stations for radio communication with the radio terminal unit, the handover control method comprising: a counting step wherein a handover control apparatus counts the number of relay routers for every candidate access router for a destination of the radio terminal unit, from a relay router; and a determining step of determining as a COR a relay router with which a sum of the numbers of relay routers for every candidate access router for the destination of the radio terminal unit, counted in the counting step, is minimum, out of candidate relay routers for the COR.

According to these aspects of the invention, determined as the COR is a relay router with which the sum of the numbers of relay routers for every candidate access router for the destination of the radio terminal unit is minimum, out of the candidate relay routers for the COR. Efficient handover control can be implemented by using a path with the smaller number of relay routers for the packet forward. According to these aspects of the invention, a communication device with the minimum sum of the numbers of relay routers for every candidate access router for the destination of the radio terminal unit is selected as the COR, and thus the efficient handover control can be performed. Namely, if packets to the radio terminal unit are buffered in this COR during the handover, the packets can be forwarded through the optimal path to the radio terminal unit after the handover; it is thus feasible to effectively utilize the network resources and to prevent the occurrence of the miss-ordering of packets.

The present invention will become more fully understood from the detailed description given herein below and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

FIG. 4 is a diagram showing an example of the table in which the identification information elements of the determined CORs and the gateway devices are stored in correspondence to each other.

FIG. 5 is a diagram showing a configuration example of data transmitted as a COR determination request in the mobile communication system of the second embodiment.

FIG. 8 is a diagram showing the correspondence between access routers as destination candidates and relay routers as COR candidates.

FIG. 10 (*a*) is a diagram showing an example of the number-of-relay-routers comparison table storing the numbers of relay routers for AR0. FIG. 10 (*b*) is a diagram showing an example of the number-of-relay-routers comparison table storing the numbers of relay routers for R2. FIG. 10 (*c*) is a diagram showing an example of the number-of-relay-routers comparison table storing the numbers of relay routers for R1.

FIG. 11 (*a*) is a diagram showing an example of the number-of-relay-routers comparison table storing the numbers of relay routers for GW. FIG. 11 (*b*) is a diagram showing an example of the number-of-relay-routers comparison table storing the numbers of relay routers for GW.

DESCRIPTION OF THE PREFERRED EMBODIMENTS

First Embodiment

The first embodiment of the present invention will be described below in detail with reference to the drawings.

Figure 1:
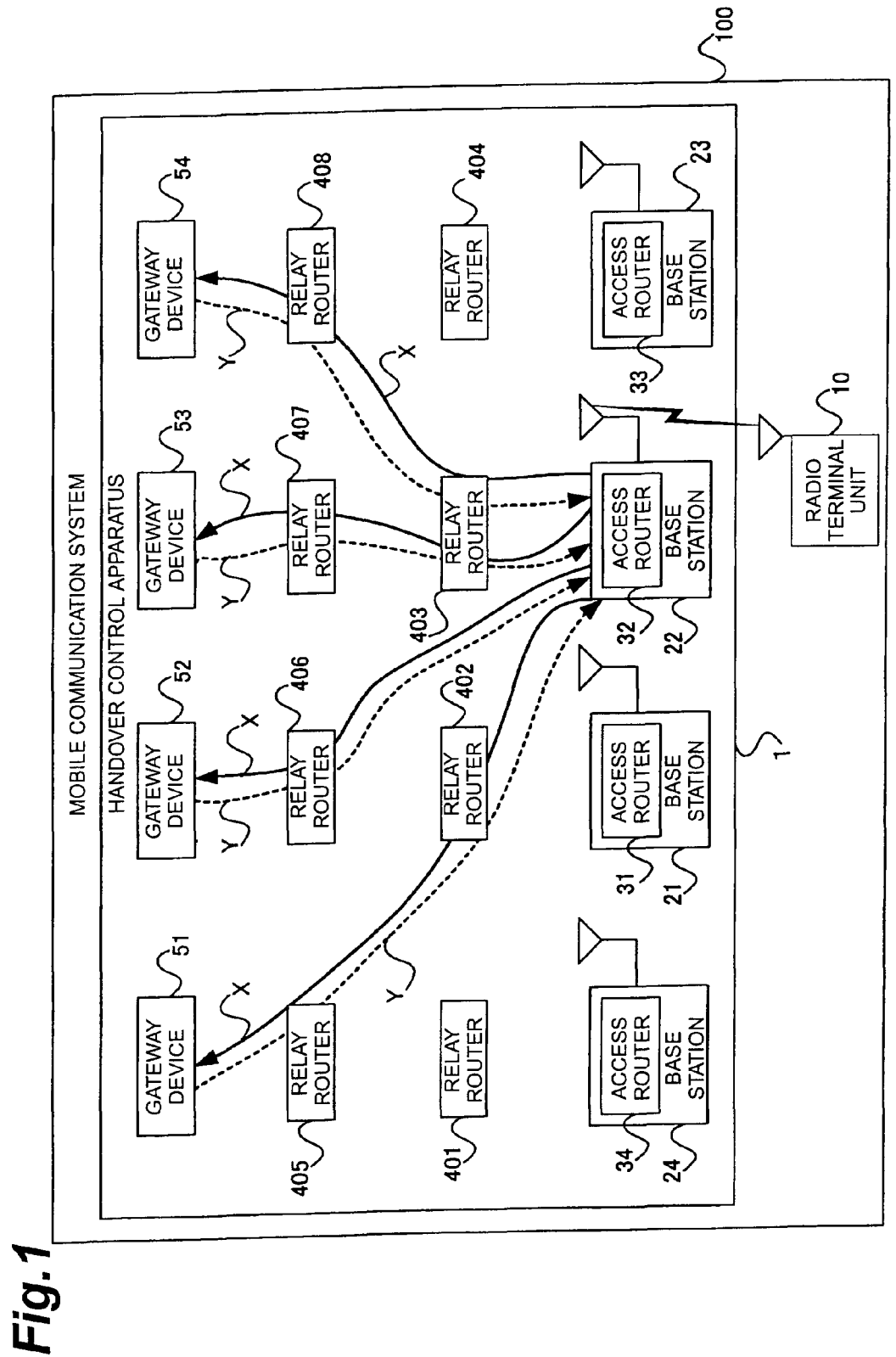
FIG. 1 is a block diagram showing the configuration of the mobile communication system according to the present invention.

FIG. 1 is a block diagram showing a configuration of the mobile communication system in the first embodiment of the present invention. The mobile communication system 100 shown in FIG. 1 comprises handover control apparatus 1 and radio terminal unit 10 such as a cellular phone or the like. The handover control apparatus 1 is comprised of a plurality of base stations 21, 22, 23, 24 for radio communication with the radio terminal unit 10; access routers 31, 32, 33, 34 provided in these base stations 21 to 24; relay routers 401 to 408 directly or indirectly connected to these access routers 31 to 34; and gateway devices 51, 52, 53, 54.

The gateway devices 51-54, the relay routers 401-408, and the access routers 31-34 will be hereinafter called collectively "communication devices," for convenience' sake of description. The communication devices constitute the mesh topology. Although not shown, the communication devices are wire-connected and are able to perform transmission and reception of data to and from each other. The wire connection is not limited to only those between adjacent communication devices.

The mobile communication system 100 is constructed according to the techniques of Mobile IP, Hierarchical Mobile IP, etc. proposed in IETF (Internet Engineering Task Force). The access routers 31 to 34 retain information about access routers (e.g., addresses thereof) to which the radio terminal unit 10 can move next. For example, the access router 32 retains the addresses of the access routers 31, 33, and 34 located around it, as the information about the access routers to which the radio terminal unit 10 can move.

The handover control in movement of the radio terminal unit 10 from a covered area with the access router 32 to a covered area with the access routers 31, 33, 34 is initiated according to signal strength of radio links by the radio terminal unit 10 or by the access router 32 to which the radio terminal unit 10 is presently connected. The handover control apparatus 1 determines a COR (Cross Over Router) out of a plurality of relay routers 401 to 408 and gateway devices 51 to 54, using the addresses of the access routers 31, 33, 34 retained in the access router 32.

The COR herein is the closest to a relay router (a hierarchy close to the radio terminal unit), out of relay routers which can forward packets to all candidate access routers for a destination of the radio terminal unit 10 on the occasion of a handover of the radio terminal unit 10 and with each which the number of relay routers from the gateway device to the destination candidate access router is minimum. If packets to the radio terminal unit 10 are buffered in this COR during the handover, the packets can be forwarded through the optimal path to the radio terminal unit after the handover, and it is thus feasible to effectively utilize the network resources and to prevent the occurrence of the miss-ordering of packets. Accordingly, it is important to determine an appropriate COR, in order to perform the handover control efficiently.

Figure 2:
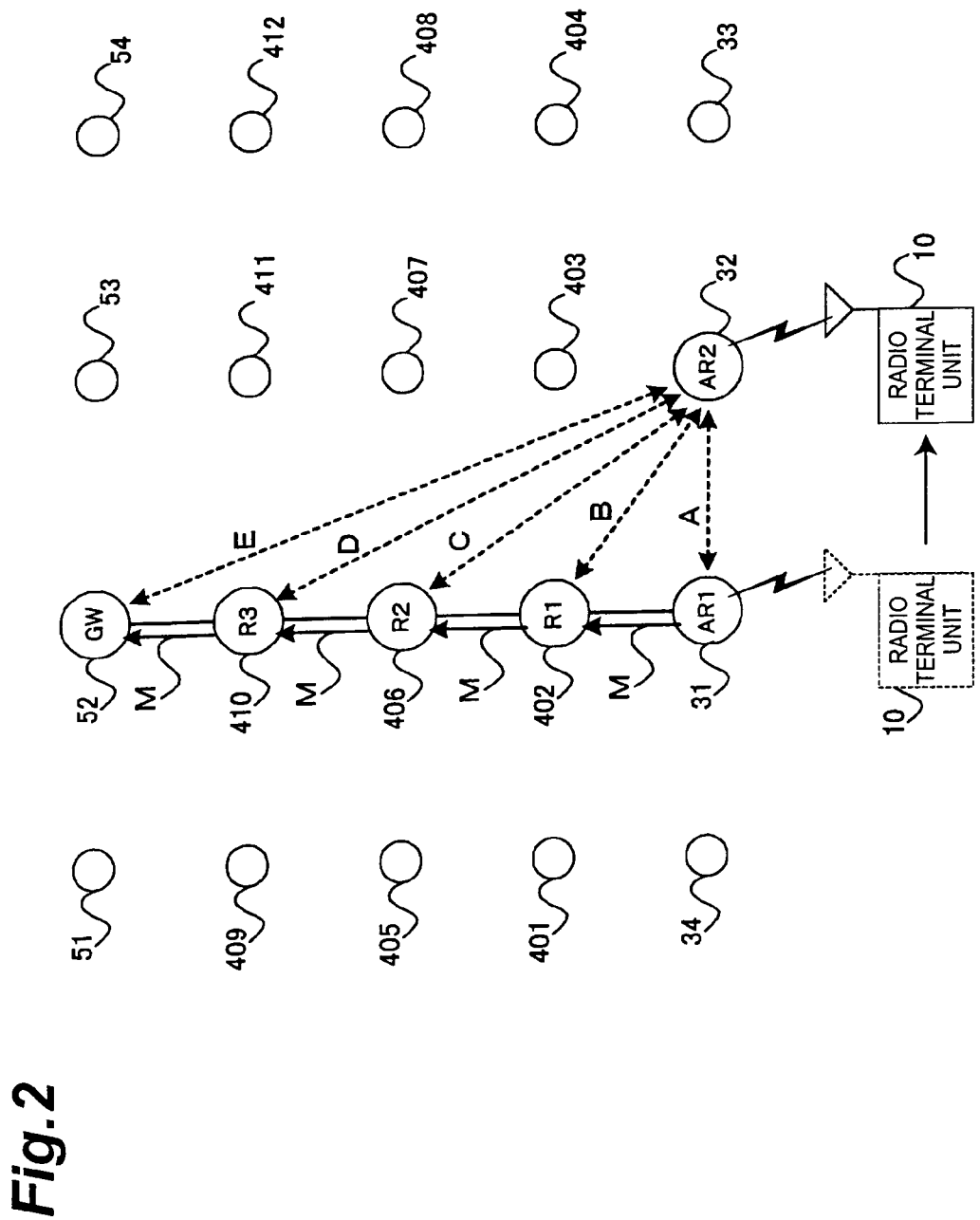
FIG. 2 is a schematic diagram for explaining the COR determining method in the mobile communication system of the first embodiment.

FIG. 2 is a schematic diagram showing a positional relation among the access routers, relay routers, and gateway devices constituting the handover control apparatus according to the present invention. In FIG. 2, AR1 indicates an old access router before movement by a handover, and AR2 is a candidate access router for a destination by the handover. R1, R2, R3, and GW denote relay routers or a gateway device as candidates for the COR. Furthermore, GW indicates that the COR to be determined is intended for communication paths between the GW and AR2.

The following will describe a determining method of the COR in the case where the radio terminal unit 10 undergoes a handover from the access router 31 to the access router 32, with reference to FIG. 2. First, the access router 31 (AR1) transmits a COR determination request to the gateway device 52 (GW). This COR determination request includes at least the address of the access router 32 (AR2) as a candidate for the destination by the handover, and the number of relay routers N(AR1) in the communication path from the gateway device 52 to the access router 32 (the communication route via dashed-line arrow A shown in FIG. 2) in the case where the access router 31 is determined as the COR.

The number of relay routers herein refers to the number of relay routers via which data of packets or the like is routed from the gateway device to the access router. The number of relay routers is minimum on the occasion of transmission of data from the gateway device to the access router, whereby the communication path between the gateway device and the access router can be the shortest route.

In the preferred embodiment, the COR determination request is transmitted from AR1 through the shortest route to GW, as indicated by arrows M of solid lines in FIG. 2. On this occasion, the COR determination request is routed via R1, R2, and R3 located between AR1 and GW. The COR determination request may also be arranged to be directly transmitted from AR1 to each communication device of R1, R2, R3, and GW.

When the relay router 402 (R1) then receives the COR determination request from the access router 31, it counts the number of relay routers N(R1) in the communication path from the gateway device 52 to the access router 32 (the communication route via dashed-line arrow B shown in FIG. 2) in the case where the relay router 402 is determined as the COR. Subsequently, the relay router 402 compares N(R1) with a value obtained by addition of 1 to the number of relay routers N(AR1).

The reason why 1 is added to the number of relay routers in the case where the router located in closer to the radio terminal unit is set as the COR, on the occasion of the comparison between the numbers of relay routers is as follows. For example, if the number of relay routers N(R1) in the case of the relay router 402 being the COR is directly compared with the number of relay routers N(AR1) in the case of the access router 31 being the COR (without addition of 1), N(AR1) becomes smaller than N(R1), though the number of relay routers between the relay router 402 and the access router 32 is equal to that between the access router 31 and the access router 32; therefore, an impartial comparison of the numbers of relay routers cannot be made between communication devices. Thus "1," which is a difference in the number of relay routers between adjacent communication devices, is added to N(AR1), whereby an impartial comparison can be made between the numbers of relay routers from the respective communication devices to the access router as a destination candidate. It was supposed in the above description that the comparison of the numbers of relay routers was made between the relay router and the access router, but much the same method is also applied to comparisons of the numbers of relay routers between a relay router and a relay router and between a relay router and a gateway device.

When the result of the comparison is N(AR1)+1≦N(R1), AR1 located in closer to the radio terminal unit is determined as the COR, out of AR1 and R1. In contrast to it, when N(AR1) +1>N(R1), the relay router 402 transmits the COR determination request to the relay router 406 located in farer from the radio terminal unit than the relay router 402.

This COR determination request includes at least the address of the candidate access router 32 (AR2) for the destination by the handover, and the number of relay routers N(R1) in the communication path from the gateway device 52 to the access router 32 in the case where the relay router 402 is determined as the COR. The identification information included in the COR determination request does not always have to be limited to the address, but it can be any information that permits identification of the access router. For example, it may be an ID to identify the communication device.

Subsequently, the relay router 406 (R2), receiving the COR determination request from the relay router 402, counts the number of relay routers N(R2) in the communication path from the gateway device 52 to the access router 32 (the communication route via dashed-line arrow C shown in FIG. 2) in the case where the relay router 406 is determined as the COR. Then the relay router 406 compares N(R2) with a value obtained by addition of 1 to the number of relay routers N(R1).

When the result of the comparison is N(R1)+1≦N(R2), R1 located in closer to the radio terminal unit is determined as the COR, out of R1 and R2. In contrast to it, when N(R1) +1>N (R2), the relay router 406 transmits the COR determination request to the relay router 410 located in farer from the radio terminal unit than the relay router 406.

This COR determination request includes at least the address of the candidate access router 32 (AR2) for the destination by the handover, and the number of relay routers N(R2) in the communication route from the gateway device 52 to the access router 32 in the case where the relay router 406 is determined as the COR. Processing similar to that for the relay router 406 will be carried out for the relay router 410 and the gateway device 52 to count the number of relay routers.

Figure 3:
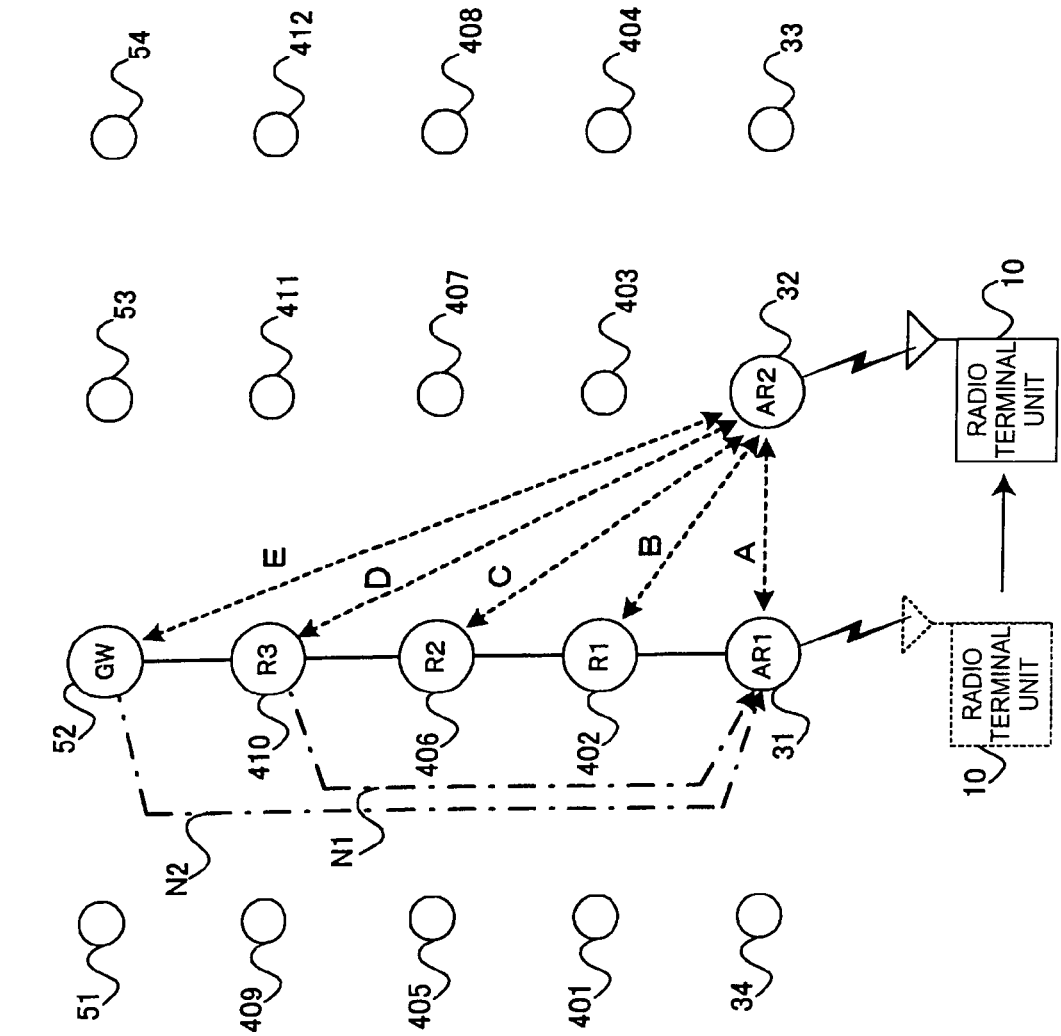
FIG. 3 is a schematic diagram for explaining in more detail the COR determining method in the mobile communication system of the first embodiment.

FIG. 3 is a schematic diagram for explaining COR notification processing in the case where the result in the above COR determining method is N(R2)+1≦N(R3). When the process of counting the number of relay routers in the case of the relay router 410 being determined as the COR results in N(R2)+1≦N(R3), R2, i.e., the relay router 406 being the relay router located in closer to the radio terminal unit is determined as the COR, out of R2 and R3. The address of the COR thus determined is transmitted from the relay router 410 to the access router 31, as indicated by an arrow N1 of a chain line in FIG. 3.

The address of the COR thus determined may be transmitted from the gateway device 52 to the access router 31, as indicated by an arrow N2 of a chain line in FIG. 3. In this case, however, the relay router 410 transmits the COR determination request including the address of the COR (relay router 406), to the gateway device 52 and the gateway device 52 receives the COR determination request from the relay router 410. This permits the gateway device 52 to recognize the COR thus determined and to notify the access router 31 of the COR.

Eventually, comparisons of the numbers of relay routers are made about the five communication paths passing the routes indicated by the dashed-line arrows A to E from the gateway device via each communication device in FIG. 2 and FIG. 3. This permits the apparatus to compare the numbers of relay routers from the gateway device 52 via each of the relay routers 410, 406, 402, and the access router 31 to the access router 32, for every case where each communication device is assumed to be the COR.

The present embodiment was described on the assumption that the candidate access router for the destination by the handover was only one device of access router 32, for convenience' sake of description, but the COR will be determined on the basis of the numbers of relay routers counted for every access router if there exist a plurality of candidate access routers for the destination, e.g., the access routers 32, 33, and 34.

As described above, the mobile communication system 100 in the first embodiment comprises the handover control apparatus 1 and the radio terminal unit 10. The handover control apparatus 1 comprises the gateway devices 51 to 54, the relay routers 401 to 412, and the access routers 31 to 34. Furthermore, the handover control apparatus 1 controls the handover of the radio terminal unit 10 between the access routers 31 to 34 provided in the respective base stations 21 to 24 for radio communication with the radio terminal unit 10. The handover control apparatus 1 comprises the counting means for counting the number of relay routers from the gateway device 52 to the candidate access router 32-34 for the destination of the radio terminal unit 10, for every access router; and the determining means for determining the COR on the basis of the number of relay routers for every access router, counted by the counting means.

The efficient handover control can be implemented by using a path with the smaller number of relay routers for the packet forward. For example, the efficient handover control can be performed when the communication device with the minimum number of relay routers between the gateway device 52 and the access router 32-34 is selected as the COR. Namely, if packets to the radio terminal unit 10 are buffered in this COR during the handover, the packets can be forwarded through the optimal path to the radio terminal unit 10 after the handover, and it is thus feasible to effectively utilize the network resources and to prevent the occurrence of the missordering of packets.

In the mobile communication system 100 in the present embodiment, it is preferable to determine as the COR a relay router with which the sum of the numbers of relay routers counted for every access router is minimum, out of the candidate relay routers for the COR. This makes minimum the sum of the numbers of relay routers from the gateway device via the COR as a route switching point to the access routers, and thus enables more efficient handover control.

The present embodiment described the COR determining method intended for the communication paths from the gateway device 52 to the access routers 32 to 34, but the COR determining method is also applied similarly to that between the other gateway devices 51, 53, 54 and the access router 32-34.

Namely, the access router 32 transmits the COR determination request to a plurality of gateway devices 51, 53, 54 through the paths indicated by arrows X of solid lines in FIG. 1, whereby the COR is determined for the communication paths from the respective gateway devices to the access router. The CORs determined are transmitted along with the address of the corresponding gateway device through the paths indicated by arrows Y of dashed lines in FIG. 1, from the gateway devices 51, 53, 54 to the access router 32. This allows the access router 32 to retain the CORs for the respective gateway devices.

FIG. 4 is a diagram showing an example of a table retained in the access router 31, in which the CORs determined according to the above COR determining method are stored in correspondence to the identification information of the gateway devices (e.g., the addresses thereof). The COR table 311 shown in FIG. 4 has a gateway device address storage area 311a and a COR address storage area 311b. In FIG. 4, the addresses of the gateway devices and the CORs are indicated using the same numerals as the reference symbols in the drawing.

In the gateway device address storage area 311a, the gateway addresses (e.g., "51," "52," "53," and "54") are stored as the identification information of the gateway devices being the destination of the COR determination request. In the COR address storage area 311b, the router addresses (e.g., "405," "406," "403," and "408") are stored as the identification information of the relay routers determined as the COR). The access router 31 can easily and quickly identify the CORs determined for the respective gateway devices by referring to the data stored in the COR table 311. By determining the COR for each gateway device in this way, it is feasible to determine the optimal COR even if the system is constructed in the mesh topology in which a plurality of communication paths arise in the mobile communication system. For this reason, the optimal COR can be determined, regardless of the network topologies, and the handover control can be performed efficiently.

In the present embodiment the COR determination request was transmitted from the old access router 32 before movement of the radio terminal unit 10 by the handover, but it may be transmitted from the radio terminal unit 10 via the access router 32.

The radio terminal unit 10 having transmitted the COR determination request is one connected to the access router before the movement by the handover. Accordingly, for determining the COR, the handover control apparatus 1 counts the number of relay routers for every access router to which the radio terminal unit 10 can move after the handover. Even in the case where the old access router 32 before the movement by the handover is not provided with the COR determination requesting function, the radio terminal unit 10 located in the covered area of the access router 32 can transmit the COR determination request to the gateway device 52, whereby the COR determination processing can be executed.

Second Embodiment

The second embodiment of the present invention will be described below in detail with reference to the drawings. In the first embodiment, the COR was determined on the basis of the number of relay routers from the gateway device to the candidate access router for the destination of the radio terminal unit. In contrast to it, the present embodiment is configured so that the COR is determined on the basis of the number of relay routers from a candidate relay router or gateway device for the COR to every candidate access router for the destination of the radio terminal unit.

The major configuration of the mobile communication system in the present embodiment is much the same as the configuration of the mobile communication system 100 described with reference to FIG. 1, and thus the illustration and detailed description of the configuration are omitted herein while the components are denoted by the same reference symbols. The following will detail the COR determining method in the mobile communication system in the second embodiment.

FIG. 5 is a diagram showing a configuration example of data transmitted as a COR determination request in the present embodiment. The COR determination request 322 shown in FIG. 5 is a COR determination request transmitted from the access router 32 to the relay router 403, and has a relay router address storage area 322a, an access router address storage area 322b, a number-of-relay-routers storage area 322c, and a COR candidate address storage area 322d. In FIG. 5, the addresses of the respective communication devices including the routers are denoted by the same numerals as the reference symbols in the drawing.

The relay router address storage area 322a is a data area storing an address of a communication device as a principal device for counting the number of relay routers. For example, where the access router 32 is a principal device for counting, "32" is stored in the relay router address storage area 322a, as shown in FIG. 5.

The access router address storage area 322b is a data area storing addresses of candidate access routers for the destination of the radio terminal unit 10 by a handover. For example, where an old access router is the access router 32, it is anticipated that the radio terminal unit moves to one of the access routers 31, 33, and 34 during the next handover; thus "31," "33," and "34" are stored in the access router address storage area 322b, as shown in FIG. 5.

The number-of-relay-routers storage area 322c is a data area storing the numbers of relay routers from the communication device to the access routers in every case where the corresponding communication device is determined as a COR and where the radio terminal unit 10 moves to each corresponding access router. For example, where the corresponding communication device is the access router 32, numbers "4," "3," and "3" indicating the numbers of relay routers to the respective access routers 31, 33, and 34 are stored in the number-of-relay-routers storage area 322c, as shown in FIG. 5.

The COR candidate address storage area 322d is a data area storing an address of a relay router or an address of a gateway device as a candidate for the COR, which received the COR determination request. The address is determined for every access router and is stored in the COR candidate address storage area 322d corresponding to each access router at the time of determination of a candidate. Therefore, the COR candidate address storage area 322d is blank corresponding to the access routers before the determination of the COR candidate, as shown in FIG. 5.

The COR determination request having the above-stated configuration is successively received by the relay routers and gateway device located in the shortest path connecting the old access router before the movement by the handover to the gateway device. Each of the relay routers and gateway device refers to the number of relay routers from the source communication device of the COR determination request and compares the number of relay routers with the number of relay routers from the destination communication device of the COR determination request.

In the case of the COR determination request having the above-stated configuration, it is judged that the COR candidates about the corresponding access routers are determined at the time when the candidates for the COR corresponding to the respective access routers 31, 33, and 34 are stored in the COR candidate address storage area. Accordingly, it is judged that the CORs are determined about the access router 32 at the time when the COR candidates are stored in all the cells of the COR candidate address storage area included in the COR determination request. This permits the relay router or the gateway device having counted the number of relay routers, to readily know that the COR determination processing is completed, by referring to the COR candidate address storage area, without access to any other communication device.

Figure 6:
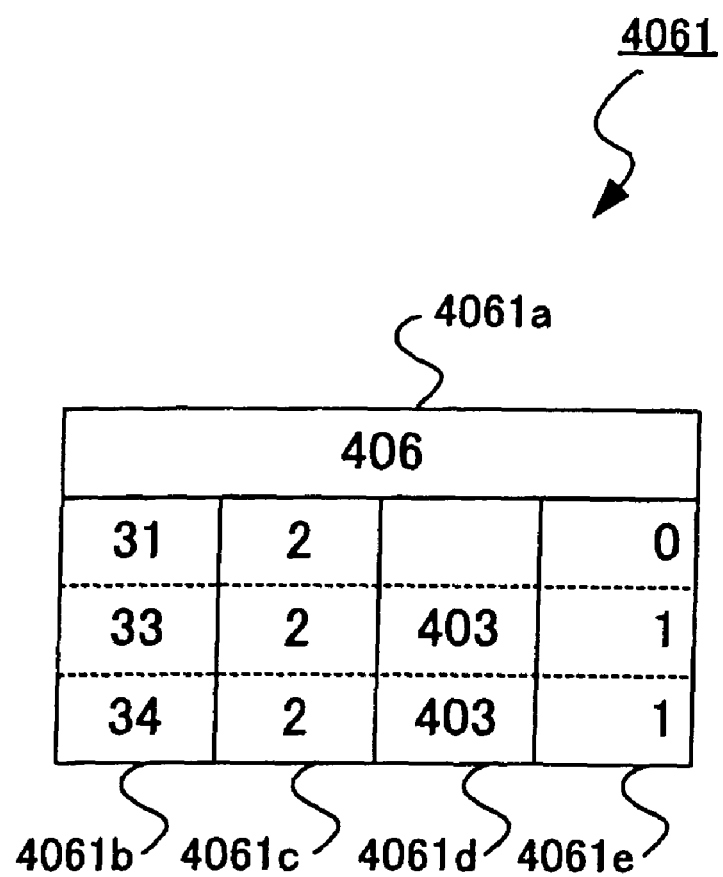
FIG. 6 is a diagram showing another configuration example of data transmitted as a COR determination request in the mobile communication system of the second embodiment.

The COR determination request can also be configured in the form shown in FIG. 6. As shown in FIG. 6, the COR determination request 4061 is different from the aforementioned COR determination request 322 in that the COR determination request 4061 is provided with an additional flag storage area 4061e. A relay router address storage area 4061a, an access router address storage area 4061b, a number-of-relay-routers storage area 4061c, and a COR candidate address storage area 4061d are much the same as the relay router address storage area 322a, access router address storage area 322b, number-of-relay-routers storage area 322c, and COR candidate address storage area 322d, respectively, as detailed above. Therefore, the detailed description thereof is omitted herein and the flag storage area 4061e will be detailed below.

The flag storage area 4061e stores binary flags for indicating completion of a decision on whether the corresponding communication device is a COR candidate, about each corresponding access router. Namely, for the access routers 33, 34 with the corresponding flag of "1," the decision on whether the relay router 406 is a candidate for the COR is completed, and for the access router 31 with the flag of "0," the decision on whether the relay router 406 is a candidate for the COR is incomplete. The COR determination request may also be arranged to indicate completion or incompletion of the decision by deleting from the COR determination request a data area corresponding to an access router for which the decision on whether the communication device is a COR candidate is completed.

Figure 7:
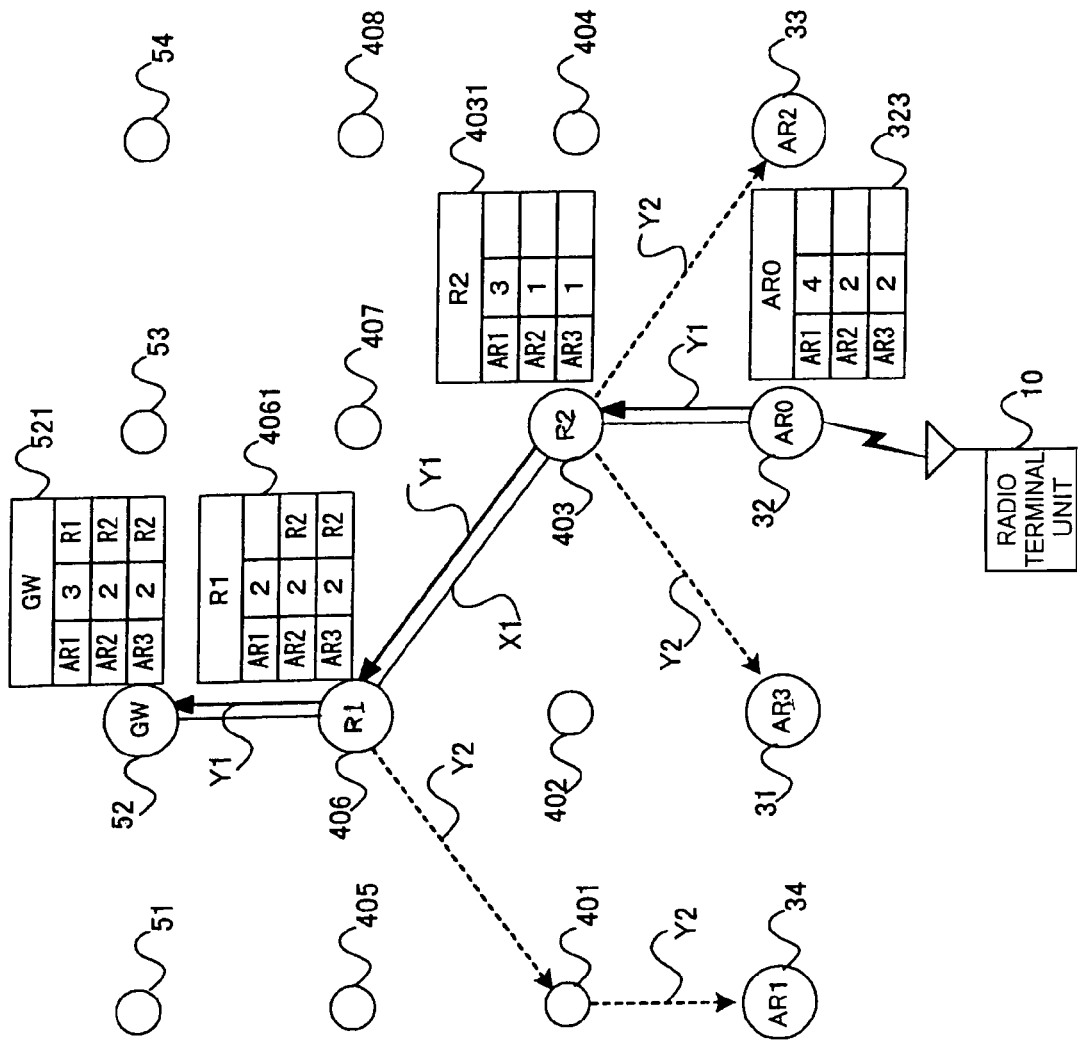
FIG. 7 is a schematic diagram for explaining the COR determining method in the mobile communication system of the second embodiment.

FIG. 7 is a schematic diagram showing a positional relation among the access routers, relay routers, and gateway devices constituting the handover control apparatus in the present embodiment. In FIG. 7, AR0 indicates an old access router before movement by a handover, and AR1, AR2, and AR3 candidate access routers for the destination by the handover. R1 and R2 indicate candidate relay routers for the COR. Furthermore, GW indicates that the COR to be determined is intended for communication paths between the GW and access routers.

In FIG. 7, the addresses of the respective communication devices are denoted by AR0, AR1, AR2, AR3, R1, R2, and GW, in order to elucidate the correspondence between the communication devices (access routers, relay routers, and gateway device) and their addresses. A solid line X1 in FIG. 7 indicates the shortest path between AR0 and GW. In FIG. 7 solid-line arrows Y1 indicate a transmission path of the COR determination request. In the same figure dashed-line arrows Y2 represent the shortest paths between the communication devices located at the both ends of the dashed-line arrows.

The following will describe the COR determining method in the case where the radio terminal unit 10 is supposed to undergo a handover from the access router 32 to one of the access routers 31, 33, and 34, with reference to FIG. 7. Just as in the case of the first embodiment, the access router 32 retains the addresses of the access routers 31, 33, and 34 to which the radio terminal unit 10 can move next.

First, the old access router 32 (AR0) before movement by the handover counts the number of relay routers to each of the access routers 31, 33, 34 and stores the result of the counting in the corresponding cells of the number-of-relay-routers storage area. In this step, the principal device for the counting is the access router 32, and the numbers of relay routers to the access router 34 (AR1), to the access router 33 (AR2), and to the access router 31 (AR3) are "4," "2," and "2," respectively, as apparent from FIG. 7; the COR determination request thus goes into the state indicated by the COR determination request 323.

Then the access router 32 transmits the COR determination request 323 to the relay router 403. The relay router 403, receiving the COR determination request 323, counts the number of relay routers from the relay router 403 to each of the access routers 31, 33, and 34 and stores the result of the counting in the corresponding cells of the number-of-relay-routers storage area in the COR determination request. In this step, the principal device for the counting is the relay router 403, and the numbers of relay routers to the access routers 31, 33, and 34 are "3," "1," and "1," respectively; the COR determination request thus goes into the state indicated by the COR determination request 4031.

In the next step, the relay router 403 transmits the COR determination request 4031 to the relay router 406. The relay router 406, receiving the COR determination request 4031, counts the number of relay routers from the relay router 406 to each of the access routers 31, 33, and 34 and stores the result of the counting in the corresponding cells of the number-of-relay-routers storage area. In this step, the principal device for the counting is the relay router 406, and the numbers of relay routers to the access routers 31, 33, and 34 are "2," "2," and "2," respectively. Accordingly, "2," "2," and "2" are stored as numerals indicating the numbers of relay routers in the number-of-relay-routers storage area.

Then the relay router 403 compares the numbers of relay routers in accordance with the COR determining method as described with reference to FIGS. 2 and 3. Namely, it performs the process of comparing the number of relay routers N(R2) from the relay router 403 with the value N(AR0)+1 obtained by addition of 1 to the number of relay routers from the access router 32, for every access router 31, 33, 34. As a result of the comparison, the relay router 403 determines AR0 located in closer to the radio terminal unit below R2, as a COR candidate, for any access router satisfying N(AR0)+1≦N(R2). Subsequently, the comparison process is carried out between the value N(R2)+1 obtained by addition of 1 to the number of relay routers from the relay router 403, and the number of relay routers N(R1) from the relay router 406. As a result of the comparison, the relay router 406 determines R2 located in closer to the radio terminal unit below R1, as a COR candidate, for any access router satisfying N(R2)+1≦N(R1).

In the present embodiment, the numbers of relay routers corresponding to the access router 33 (AR2) and the access router 31 (AR3) both satisfy N(R2)+1≦N(R1) in the relay router 406. Accordingly, R2, i.e., the relay router 403 is determined as a candidate for the COR in the case where the radio terminal unit 10 moves from the access router 32 to the access routers 33, 31. The address of the relay router 403 thus determined is stored in the corresponding cells of the COR candidate address storage area in the COR determination request. Since at this point the COR in the case of the radio terminal unit 10 moving to the access router 34 is not determined yet, the cell of the COR candidate address storage area corresponding to the access router 34 still remains blank. As a result, the COR determination request goes into the state indicated by the COR determination request 4061.

The gateway device 52 located at the end of the transmission path of the COR determination request also performs much the same processing as the relay router 406 did. Namely, the gateway device 52, receiving the COR determination request 4061 transmitted from the relay router 406, counts the number of relay routers from the gateway device 52 to the access router 34, and stores the result of the counting in the corresponding cell of the number-of-relay-routers storage area in the COR determination request. In this step, the principal device for the counting is the gateway device 52 and the numbers of relay routers to the access routers 34 are "3," "2," and "2," respectively. Accordingly, "3," "2," and "2" are stored as numerals indicating the numbers of relay routers in the number-of-relay-routers storage area.

Then the gateway device 52 performs the comparison process between the value N(R1)+1 obtained by addition of 1 to the number of relay routers from the relay router 406 and the number of relay routers N(GW) from the gateway device 52, for the access router 34. As a result of the comparison, the gateway device 52 determines R1 located in closer to the radio terminal unit below GW, as a COR, for any access router satisfying N(R1)+1≦N(GW).

In the present embodiment, the number of relay routers corresponding to the access router 34 (AR1) satisfies N(R1)+1≦N(GW). Accordingly, the relay router 406 is determined as a COR in the case where the radio terminal unit 10 moves from the access router 32 to the access router 34. The address of the relay router 406 determined is stored in the COR candidate address storage area in the COR determination request. As a consequence, the COR determination request goes into the state indicated by the COR determination request 521. FIG. 8 shows the correspondence between the access routers as destination candidates and the relay routers as COR candidates, settled by the above COR determination processing.

Since the COR in the case of the radio terminal unit 10 moving to the access router 34 was determined, the data was stored in all the cells of the COR candidate address storage area in the COR determination request. In other words, the relay router 406 being the COR in the movement to the access router 34 is the last determined COR, and this COR is determined as a COR in the handover of the radio terminal unit 10 from the access router 32. The gateway device 52 notifies the access router 32 of the CORs thus determined.

In the present embodiment, the COR was determined with reference to the number of relay routers from the candidate relay router for the COR to the candidate access router for the destination of the radio terminal unit, but the COR may also be determined with reference to the number of relay routers from a candidate relay router or gateway device for the COR to the access router as a destination of the radio terminal unit.

As described above, the mobile communication system in the second embodiment comprises the handover control apparatus and the radio terminal unit 10. The handover control apparatus comprises the gateway devices 51 to 54, the relay routers 401 to 408, and the access routers 31 to 34. Furthermore, the handover control apparatus controls the handover of the radio terminal unit 10 between the access routers 31-34 provided in the respective base stations for radio communication with the radio terminal unit 10. The handover control apparatus comprises the counting means for counting the number of relay routers from the relay router 403, 406 to the candidate access router 31, 33, 34 for the destination of the radio terminal unit 10, for every access router on the occasion of the handover of the radio terminal unit 10; and the determining means for determining the COR on the basis of the number of relay routers for every access router counted by the counting means.

The efficient handover control can be implemented by using a path with the smaller number of relay routers for the packet forward. When the communication device with the minimum number of relay routers between the relay router 403, 406 and the access router 31, 33, 34 is selected as the COR, the efficient handover control can be performed. Namely, if packets to the radio terminal unit 10 are buffered in this COR during the handover, the packets can be forwarded through the optimal path to the radio terminal unit 10 after the handover; it is thus feasible to effectively utilize the network resources and to prevent the occurrence of the miss-ordering of packets.

In the mobile communication system in the second embodiment, the gateway address is also stored as identification information of the gateway device as a destination of the COR determination request in the gateway device address storage area, as in the first embodiment. The router addresses are stored as identification information of the relay routers determined as CORs, in the COR address storage area. The access router 32 is allowed to easily and quickly identify the COR determined for every gateway device, by referring to the data stored in the COR table. When the present embodiment is also configured to determine the COR for every gateway device, the optimal COR can be determined even if the system is configured in the mesh topology in which a plurality of communication routes arise in the mobile communication system. Therefore, the optimal COR can be determined, regardless of the network topologies, and the handover control can be performed efficiently.

Third Embodiment

The third embodiment of the present invention will be described below in detail with reference to the drawings. In the second embodiment, the relay router or the gateway device was used to determine the COR candidate and COR. In contrast to it, the access router is used to determine the COR candidate and COR in the present embodiment.

The principal configuration of the mobile communication system in the present embodiment is much the same as the configuration of the mobile communication system 100 described with reference to FIG. 1, and thus the illustration and detailed description of the configuration are omitted herein while the same reference symbols denote the components. The following will detail the COR determining method in the mobile communication system in the third embodiment.

Figure 9:
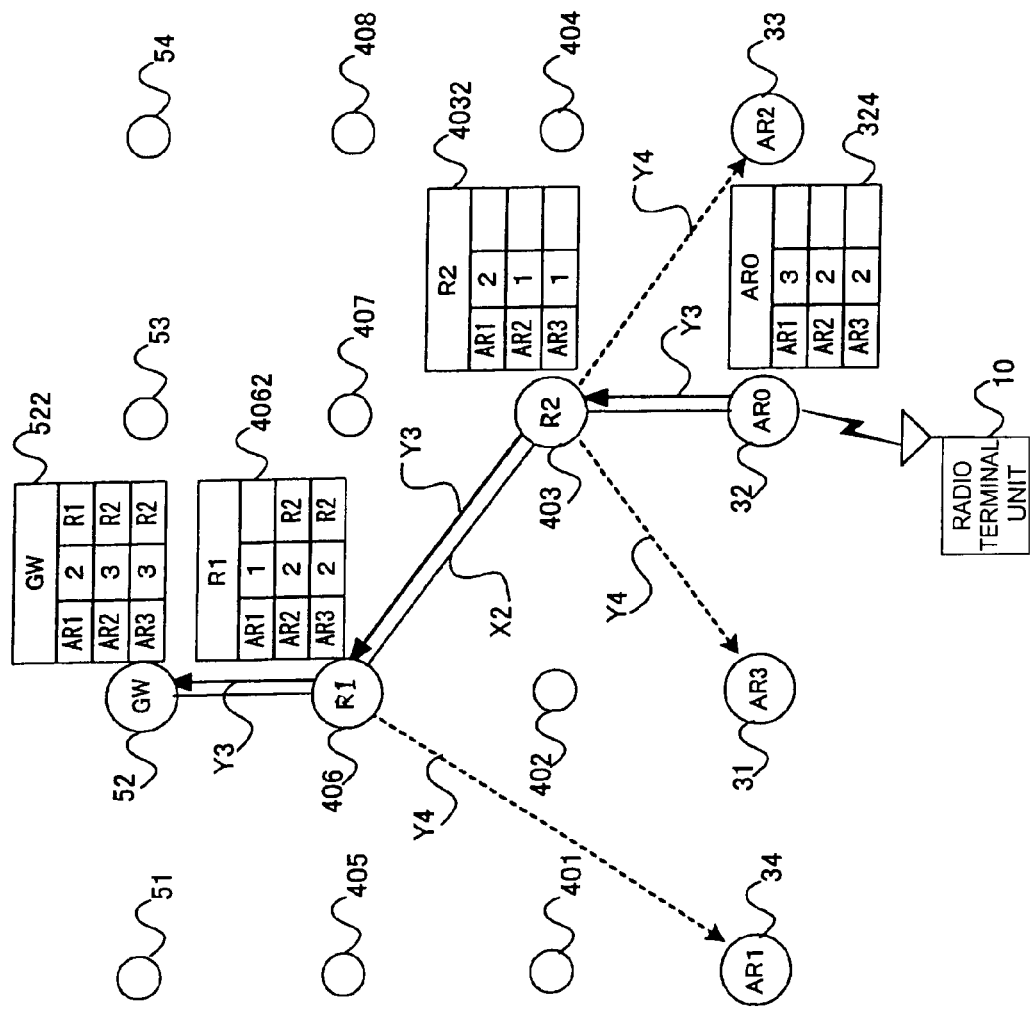
FIG. 9 is a schematic diagram for explaining the COR determining method in the mobile communication system of the third embodiment.

FIG. 9 is a schematic diagram showing a positional relation among the access routers, relay routers, and gateway devices constituting the handover control apparatus in the present embodiment. In FIG. 9, AR0 designates an old access router before movement by a handover, and AR1, AR2, and AR3 candidate access routers for the destination by the handover. R1 and R2 represent candidate relay routers for the COR, which received the COR determination request. Furthermore, GW indicates that the COR to be determined is intended for communication paths between the GW and access routers.

In FIG. 9, the addresses of the respective communication devices are denoted by AR0, AR1, AR2, AR3, R1, R2, and GW, in order to elucidate the correspondence between the communication devices (access routers, relay routers, and gateway device) and their addresses. In FIG. 9 a solid line X2 indicates the shortest path between AR0 and GW. In FIG. 9 arrows Y3 of solid lines represent a transmission path of the COR determination request. In the same figure dashed-line arrows Y4 indicate the shortest paths between the communication devices located at the both ends of the dashed-line arrows.

The following will describe the COR determining method in the case where the radio terminal unit 10 is supposed to undergo a handover from the access router 32 to one of the access routers 31, 33, and 34, with reference to FIG. 9. Just as in the case of the second embodiment, the access router 32 retains the addresses of the access routers 31, 33, 34 to which the radio terminal unit 10 can move next.

First, the access router 32 generates a COR determination request 324. The COR determination request 324 is generated by much the same method as the COR determination request 323 in the second embodiment was. Subsequently, the access router 32 transmits the COR determination request 324 to the relay router 403.

The access router 32 stores the numbers of relay routers (3, 2, 2) from the access router 32 (AR0) to the access routers 31, 33, 34 (AR3, AR2, AR1), counted in the generation of the COR determination request 324, in a number-of-relay-routers storage area 325a of a number-of-relay-routers comparison table 325 shown in FIG. 10 (a). As a consequence, the number-of-relay-routers comparison table 325 goes into the state shown in FIG. 10 (a).

The relay router 403, receiving the COR determination request 324 from the access router 32, generates a COR determination request 4032 by much the same method as that for the COR determination request 4031 in the second embodiment. The relay router 403 notifies the access router 32 of the numbers of relay routers from the relay router 403 (R2) to the access routers 31, 33, 34 (AR3, AR2, AR1), counted in the generation of the COR determination request 4032.

The access router 32, receiving the notification, adds 1 to each of the numbers of relay routers (3, 2, 2) corresponding to the access router 32 (AR0) in order to compare the numbers of relay routers by much the same method as the comparison process of the numbers of relay routers in the second embodiment (i.e., the comparison method described with reference to FIGS. 2 and 3). As a consequence, the number-of-relay-routers storage area 325a is updated, and "4, 3, 3" are stored therein.

Then the access router 32, receiving the numbers of relay routers from the relay router 403, stores the numbers of relay routers (2, 1, 1) in a number-of-relay-routers storage area 325b of the number-of-relay-routers comparison table 325. As a consequence, the number-of-relay-routers comparison table 325 goes into the state shown in FIG. 10 (b).

The relay router 406 and the gateway device 52 perform much the same processing as the relay router 403 did. Namely, the relay router 406 notifies the access router 32 of the numbers of relay routers from the relay router 406 (R1) to the access routers 31, 33, 34 (AR3, AR2, AR1). The numbers of relay routers thus notified of are stored in a number-of-relay-routers storage area 325c of the number-of-relay-routers comparison table 325. As a consequence, the number-of-relay-routers comparison table 325 goes into the state shown in FIG. 10 (c).

Furthermore, the gateway device 52 notifies the access router 32 of the numbers of relay routers from the gateway device 52 (GW) to the access routers 31, 33, 34 (AR3, AR2, AR1). The numbers of relay routers thus notified of are stored in the number-of-relay-routers storage area 325d of the number-of-relay-routers comparison table 325. As a consequence, the number-of-relay-routers comparison table 325 goes into the state shown in FIG. 11 (a).

After completion of the storage and update for all the numbers of relay routers corresponding to AR0, R2, R1, and GW, the access router 32 calculates a sum of the numbers of relay routers for every communication device. The sums thus calculated are stored as the total numbers of relay routers in a number-of-relay-routers storage area 325e of the number-of-relay-routers comparison table 325. As a consequence, the number-of-relay-routers comparison table 325 goes into the state shown in FIG. 11 (b).

Subsequently, the access router 32 compares the sums of relay routers stored each in the number-of-relay-routers storage area 325e, to determine a communication device with the smallest sum as the COR out of AR0, R2, R1, and GW. In the present embodiment, the smallest sum is "8." There exist two communication devices corresponding to the pertinent sum, R1 and GW. In such a case, R1 closer to the access router 32, i.e., the relay router 406 is determined as a COR, in order to make the communication path shorter from the COR to the access router.

As described above, the mobile communication system in the third embodiment comprises the handover control apparatus and the radio terminal unit 10. The handover control apparatus comprises the gateway devices 51 to 54, the relay routers 401 to 408, and the access routers 31 to 34. Furthermore, the handover control apparatus controls the handover of the radio terminal unit 10 between the access routers 31-34 provided in the respective base stations for radio communication with the radio terminal unit 10. The handover control apparatus comprises the counting means for counting the number of relay routers for every candidate access router for the destination of the radio terminal unit 10, from the relay router, on the occasion of the handover of the radio terminal unit 10; and the determining means for determining the relay router with the minimum sum of the numbers of relay routers for every access router, counted by the counting means, as a COR.

Accordingly, the relay router with the minimum sum of the numbers of relay routers for every access router is determined as a COR, out of the candidate relay routers for the COR. The efficient handover control can be performed by using a path with the smaller number of relay routers for the packet forward. Since the communication device with the minimum sum of the numbers of relay routers between the access router 32 and the access routers 31, 33, 34 is selected as a COR, the number of relay routers to the destination access router becomes minimum on average. Accordingly, the efficient handover control can be performed. Namely, if packets to the radio terminal unit 10 are buffered in this COR during the handover, the packets can be forwarded through the optimal path to the radio terminal unit 10 after the handover; it is thus feasible to effectively utilize the network resources and to prevent the occurrence of the miss-ordering of packets.

In the mobile communication system in the third embodiment, the gateway address is stored as identification information of the gateway device as a destination of the COR determination request in the gateway device address storage area, as in the first and second embodiments. The router addresses are stored as identification information of the relay routers determined as CORs in the COR address storage area. The access router 32 is allowed to easily and quickly identify the COR determined for every gateway device, by referring to the data stored in the COR table. When the present embodiment is also configured to determine the COR for every gateway device, the optimal COR can be determined even if the system is configured in the mesh topology in which a plurality of communication paths arise in the mobile communication system. For this reason, the optimal COR can be determined, regardless of the network topologies, and the handover control can be performed efficiently.

In the present embodiment, the relay router with the minimum sum of the numbers of relay routers for every access router was determined as a COR, but it is also possible to configure the mobile communication system according to the present invention in a modification described below.

For example, the access router 32 acquires a communication device (AR0, R2, R1, GW) with the minimum number of relay routers for every access router (AR1, AR2, AR3) and determines a communication device with the largest number of times that the number of relay routers becomes minimum, as a COR.

Figure 12:
FIG. 12 is a diagram showing an example of the number-of-relay-routers comparison table in the modification of the third embodiment.

The modification of the third embodiment will be described below in detail with reference to FIG. 12. FIG. 12 is a diagram showing an example of the number-of-relay-routers comparison table in the modification. Each of the numbers of relay routers in circles in FIG. 12 indicates that the number of relay routers is minimum among the numbers of relay routers in each common address of an access router (AR1, AR2, AR3).

In FIG. 12, with focus on the case where the destination access router is AR1, the device with the minimum number of relay routers is R1, i.e., the relay router 406. Similarly, with focus on the case where the destination access router is AR2, the device with the minimum number of relay routers is R2, i.e., the relay router 403. Furthermore, with focus on the case where the destination access router is AR3, the device with the minimum number of relay routers is R2, i.e., the relay router 403. Accordingly, the relay router 403, with which the number of times that the number of relay routers is minimum is the largest, two, is determined as a COR. If there appear a plurality of devices with which the number of times that the number of relay routers is minimum is the largest, a device located in closer to the radio terminal unit will be determined as a COR, in order to make the communication path shorter from the COR to the access router.

In the modification, a redundant path can be made between the COR and the access router, but the greater number of access routers can have the minimum number of relay routers from the COR to the destination access router. Therefore, the probability of the transmission path from the COR to the destination access router becoming the shortest path is high.

Furthermore, it is also possible to employ a method of obtaining the difference in the number of relay routers from the gateway device 52 to the access router 31, 33, 34 among the communication devices (AR0, R2, R1, GW) and determining a communication device with the maximum difference as a COR. This permits the communication device to be selected as a COR while largely reducing redundant paths.

The COR determination processing in all the above embodiments is preferably executed on the occasion of change in the network topology, or at intervals of a fixed time, or immediately before a handover.

In the third embodiment, the radio terminal unit 10 may be configured to execute the sequential processing executed for the determination of the COR by the access router 32.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A relay router for transmission and reception of data between a plurality of base stations or a plurality of access routers, and gateway apparatus, the relay router comprising:
    a transmitting unit configured to transmit a number of relay routers to an old access router before handover, wherein the number of relay routers is counted from the relay router to each of candidate access routers for a destination of a radio terminal unit;
    a storing unit configured to store the number of relay routers in a cell of a number-of-relay-routers storage area; and
    a comparing unit configured to compare the number of relay routers from the relay router with a value obtained by adding 1 to a number of relay routers from the old access router.

2. A gateway apparatus connected to access routers, the gateway apparatus comprising:
    a transmitting unit configured to transmit a number of relay routers to an old access router before handover, wherein the number of relay routers is counted from the gateway apparatus to each of candidate access routers for a destination of a radio terminal unit;
    a storing unit configured to store the number of relay routers in a cell of a number-of-relay-routers storage area; and
    a comparing unit configured to compare the number of relay routers from the gateway apparatus with a value obtained by adding 1 to a number of relay routers from a relay router located closest to the gateway apparatus.

3. The relay router according to claim 1, further comprising:
    a counting unit configured to count the number of relay routers.

4. The relay router according to claim 3, wherein the counting unit is configured to count the number of relay routers in response to a cross over router determination request transmitted from the old access router.

5. The gateway apparatus according to claim 2, further comprising:
    a counting unit configured to count the number of relay routers.

6. The gateway apparatus according to claim 5, wherein the counting unit is configured to count the number of relay routers in response to a cross over router determination request transmitted from the old access router.

* * * * *